*US009573777B2*

(12) United States Patent
Aumann

(10) Patent No.: US 9,573,777 B2
(45) Date of Patent: Feb. 21, 2017

(54) TRANSPORT DEVICE FOR CONVEYING PRODUCTS

(71) Applicant: Uhlmann Pac-Systeme GmbH & Co. KG, Laupheim (DE)

(72) Inventor: Thomas Aumann, Dettingen (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 3 days.

(21) Appl. No.: 14/556,899

(22) Filed: Dec. 1, 2014

(65) Prior Publication Data

US 2015/0151929 A1    Jun. 4, 2015

(30) Foreign Application Priority Data

Dec. 3, 2013 (EP) ..................... 13195422

(51) Int. Cl.
| | | |
|---|---|---|
| *B65G 54/02* | (2006.01) | |
| *B65G 21/22* | (2006.01) | |
| *B65B 61/20* | (2006.01) | |
| *B65H 29/00* | (2006.01) | |
| *B65B 35/16* | (2006.01) | |

(52) U.S. Cl.
CPC .............. *B65G 54/02* (2013.01); *B65B 61/20* (2013.01); *B65H 29/003* (2013.01); *B65B 35/16* (2013.01); *B65H 2220/01* (2013.01); *B65H 2301/4471* (2013.01); *B65H 2301/4472* (2013.01); *B65H 2301/4474* (2013.01); *B65H 2403/513* (2013.01); *B65H 2405/55* (2013.01); *B65H 2405/581* (2013.01); *B65H 2701/18271* (2013.01); *B65H 2801/81* (2013.01)

(58) Field of Classification Search
None
See application file for complete search history.

(56) References Cited

U.S. PATENT DOCUMENTS

| | | | |
|---|---|---|---|
| 3,524,530 A | | 8/1970 | Schuster |
| 4,504,936 A | * | 3/1985 | Faber ................. G06K 17/0012 360/98.05 |
| 5,261,520 A | | 11/1993 | Duke |
| 6,098,478 A | * | 8/2000 | Sandrock ................. B25J 9/109 74/53 |

(Continued)

FOREIGN PATENT DOCUMENTS

| | | |
|---|---|---|
| DE | 1586137 A1 | 4/1970 |
| EP | 1050472 A2 | 11/2000 |

(Continued)

OTHER PUBLICATIONS

European Search Report for EP 131954422.

*Primary Examiner* — Kavel Singh
(74) *Attorney, Agent, or Firm* — Brinks Gilson & Lione

(57) ABSTRACT

The transport device has at least one movable slide for conveying blister packs. A linear motor drive device is used to drive the slide along a guide rail. The slide has at least one permanent magnet for interaction with the linear motor drive device. In addition, a retaining element for holding a product insert is arranged on the slide and is moved with the slide. The retaining element is operable between an activated or closed position to hold the product insert and a deactivated or opened position to receive or release the product insert.

7 Claims, 5 Drawing Sheets

(56) References Cited

U.S. PATENT DOCUMENTS

2008/0193270 A1\* 8/2008 Yoshida .................... B66C 7/02
                                                    414/731
2008/0219825 A1\* 9/2008 Yoshida ................ B65G 17/20
                                                    414/749.6

FOREIGN PATENT DOCUMENTS

| EP | 1790593 A1 | 5/2007 |
| EP | 2216278 A2 | 8/2010 |
| WO | WO 2013/156177 A1 | 10/2013 |

\* cited by examiner

TRANSPORT DEVICE FOR CONVEYING PRODUCTS

RELATED APPLICATIONS

The present patent document claims the benefit of priority to European Patent Application No. EP 13195422.4, filed Dec. 3, 2013, the entire contents of which are incorporated herein by reference.

FIELD AND BACKGROUND OF THE INVENTION

The present invention relates to a transport device for conveying products, in particular blister packs.

In the pharmaceutical industry, so-called "blister packs" are frequently used as packaging for medications. These blister packs contain a plurality of pockets, in which the pharmaceutical products such as tablets or coated tablets are held. The blister packs are usually introduced individually or as stacks of blister packs into additional outer packaging such as folding boxes.

In addition to the blister pack, an associated product insert is usually introduced into the outer package. According to U.S. Pat. No. 3,524,530, a continuously moving, endless transport chain has several product receptacles, in each of which a product can be placed. It is also possible, with the help of a transfer device, to assign a product insert to each product receptacle. For this purpose, the product insert is transferred by the transfer device to an appropriate clamping pocket on each of the product receptacles. The transfer device consists of a rotary table, on which several grippers for picking up, holding, and transferring the product inserts are arranged in the circumferential direction.

In addition to the previously mentioned continuously moving endless transport chain for feeding the blister packs, a transport device in which several slides are moved independently of each other along a guide rail is known. In this case the guide rail comprises a linear motor drive device for driving the slides, wherein each slide comprises at least one permanent magnet, which works together with the linear motor drive device. A transport device of this type with a linear motor drive is known, for example, from WO 2013/156177 A1.

SUMMARY OF THE INVENTION

It is an object of the present invention to provide a device for conveying products and the associated product inserts in which the throughput is improved and which requires the fewest possible mechanical parts.

According to an aspect of the invention, the transport device for conveying products, in particular blister packs, comprises at least one movable slide for conveying at least one product and a stationary endless guide rail for guiding the at least one slide. A linear motor drive device is provided to drive the at least one slide, wherein the at least one slide comprises at least one permanent magnet, which works together with the linear motor drive device. In addition, a retaining element for holding the product insert assigned to the at least one product is arranged on the slide. The retaining element can be brought into an activated state (e.g., a closed position) for holding the product insert and into a deactivated state (e.g., an opened position) for receiving or releasing the product insert. The retaining element is arranged on the slide in such a way that the product insert is held to one side of the travel path along which the at least one product travels and is carried along with the movement of the at least one product along the guide rail.

One advantage is that the total number of components required to transport the products and the assigned product inserts is reduced. Whereas a retaining element for holding a product insert must be present on each receptacle of the conventional product transport chains, only one retaining element per slide is required according to the invention. If the guide rail and the product transport chain are of comparable length, the number of slides which are guided along the guide rail will be smaller than the number of receptacles of a product transport chain. In addition, there is no longer any need to have two parallel transport devices, one for the products and another for the product inserts. Another advantage is that, because of the joint transport of product and product insert, it is a simple matter to coordinate the movements at the time of transfer or insertion into a folding box. Finally, as a result of the ability to move the slides together with their retaining elements individually, it now becomes possible to compensate for system time-outs or waiting periods for the slides when defective products or product inserts are encountered.

When the retaining element is configured as a gripper with two gripping arms, wherein at least one gripping arm is pretensioned toward the other gripping arm and thus toward the activated or closed position, this pretensioning being achieved in particular by the force of a spring, an advantage is obtained to the extent that, to control the gripper, it is necessary only to ensure that the gripper can be opened. The retaining element can also be provided in some other form, however, such as in the form of a suction cup or a suction arm.

The retaining element is preferably supported pivotably around a rotational axis which is substantially perpendicular to the path of the guide rail, wherein the retaining element, with respect to its rotational position, can be pivoted between a product insert receiving position and a product insert transfer position. Thus the product inserts can be brought easily as needed into different orientations such as a vertical position or a horizontal position. As a result, the product insert can be reliably inserted into the retaining element (in the product insert receiving position), whereas at the same time it is guaranteed that the product insert will be carried along automatically into the folding box (in the product insert transfer position) when the products are inserted.

The pivot angle between the product insert receiving position and the product insert transfer position is preferably approximately 90°.

Because the retaining element is pretensioned toward the product insert transfer position, in particular by means of a spring, the advantageous result is achieved that, while the slide is moving around the guide rail, the position of the product insert is fixed on the slide at all times, especially at the time when the products are transferred from the slide to the folding box.

It is also preferable for the gripping arms to extend substantially transversely to the travel path of the products when in the product insert receiving position and to be substantially parallel to the travel path of the products when in the product insert transfer position. One advantage of this is that, when the gripper is in the product insert receiving position, the product insert can drop easily into the opened gripper without the danger that the product insert will slip out of the space between the gripping arms.

To limit the pivoting movement of the retaining element, a stop is preferably formed on the slide, against which the retaining element rests when in the product insert transfer position.

In one preferred embodiment, a cam plate is arranged on the guide rail, and a cam roller, which rolls along the cam plate, is arranged on the retaining element, wherein the cam plate and the cam roller cooperate in such a way that the movement of the slide along the guide rail causes the retaining element to pivot. The cam plate makes it possible to control the pivoting movement of the retaining element in a precisely reproducible manner, whereas the technical effort required is quite modest.

The cam plate preferably comprises a first curved section and a second curved section, wherein, when the cam roller rolls along the first curved section, the retaining element is moved into the product insert receiving position, and, when the cam roller rolls along the second curved section, the retaining element is moved into the product insert transfer position. Thus, in a simple manner, a system of positive guidance is created in which two rotational directions of the retaining element are realized by means of the linear movement of the slide in only one direction.

In a further elaboration, a pusher element is provided in the area of the first section of the cam plate to hold the gripping arms a certain distance apart against the pretensioning force, so that the gripper is open and can thus receive a product insert.

Each slide preferably comprises a bottom element and two side boundary elements, which project vertically up from the bottom element and extend transversely to the travel path of the products. These boundary elements define the receptacle for the products, and it is advantageous for the receptacle to be open on both sides in the direction transverse to the travel path of the products. As a result, it is possible to hold the products securely during transport, whereas it is also possible for the pusher to push the products together with the product inserts into a package via the open sides.

BRIEF DESCRIPTION OF THE DRAWINGS

Additional properties and advantages of the present invention can be derived from the following description, which refers to the drawings.

DETAILED DESCRIPTION OF SPECIFIC EMBODIMENTS

Figure 1:
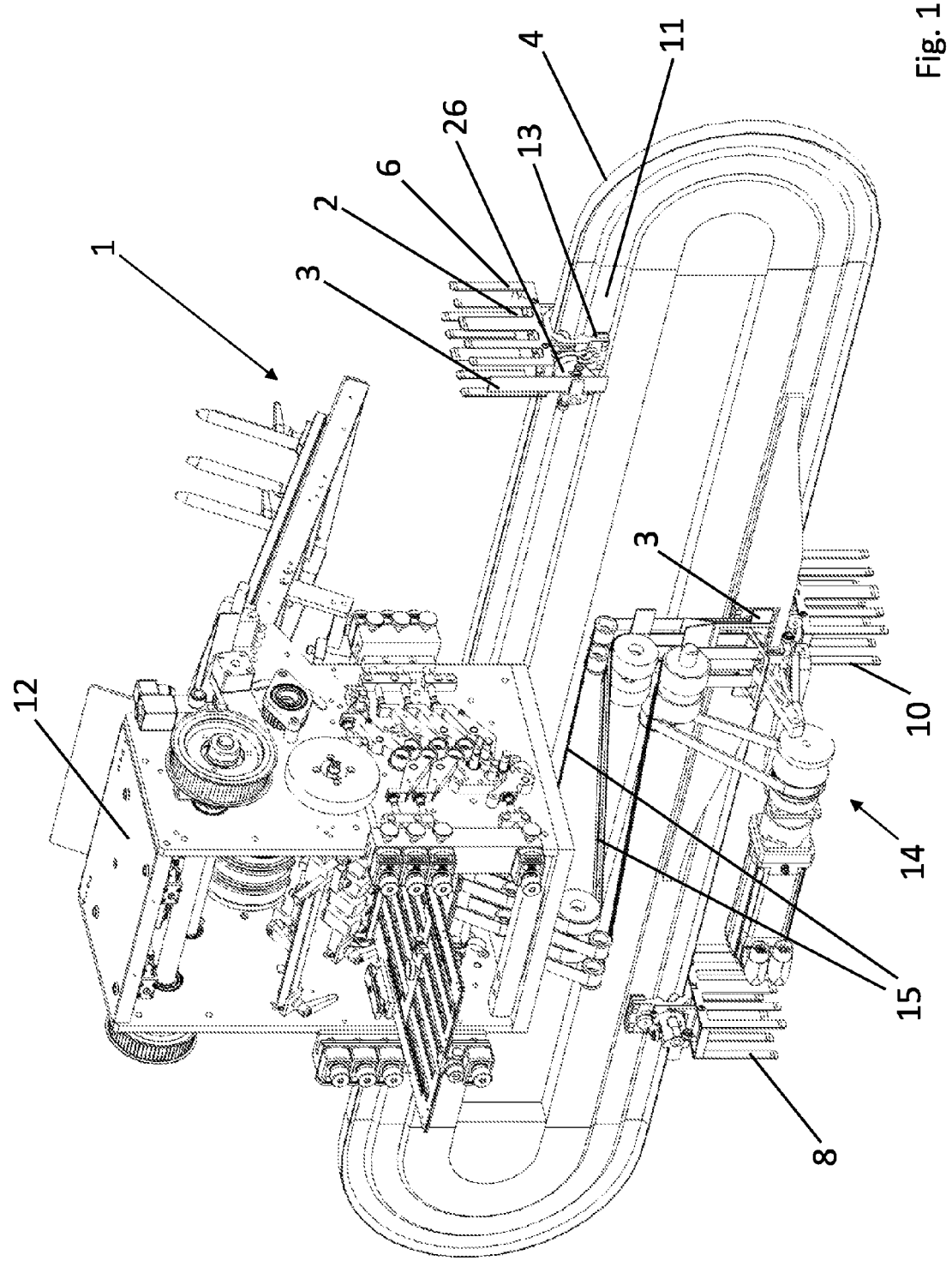
FIG. 1 shows a perspective view of a transport device according to the invention, in which a folding station and a product insert feed station are also shown.

FIG. 1 shows the basic structure of a transport device 1 according to the invention for conveying products 2, in particular blister packs or stacks of blister packs. The transport device 1 comprises a stationary, endless guide rail 4 for guiding the movable slides 6, 8, 10, which serve to convey the products 2 and which travel along the guide rail 4. Even though only three slides 6, 8, 10 are present in the example shown here, usually more than three slides will be moving simultaneously along the same guide rail 4. Fewer than three slides can also be present.

Figure 2:
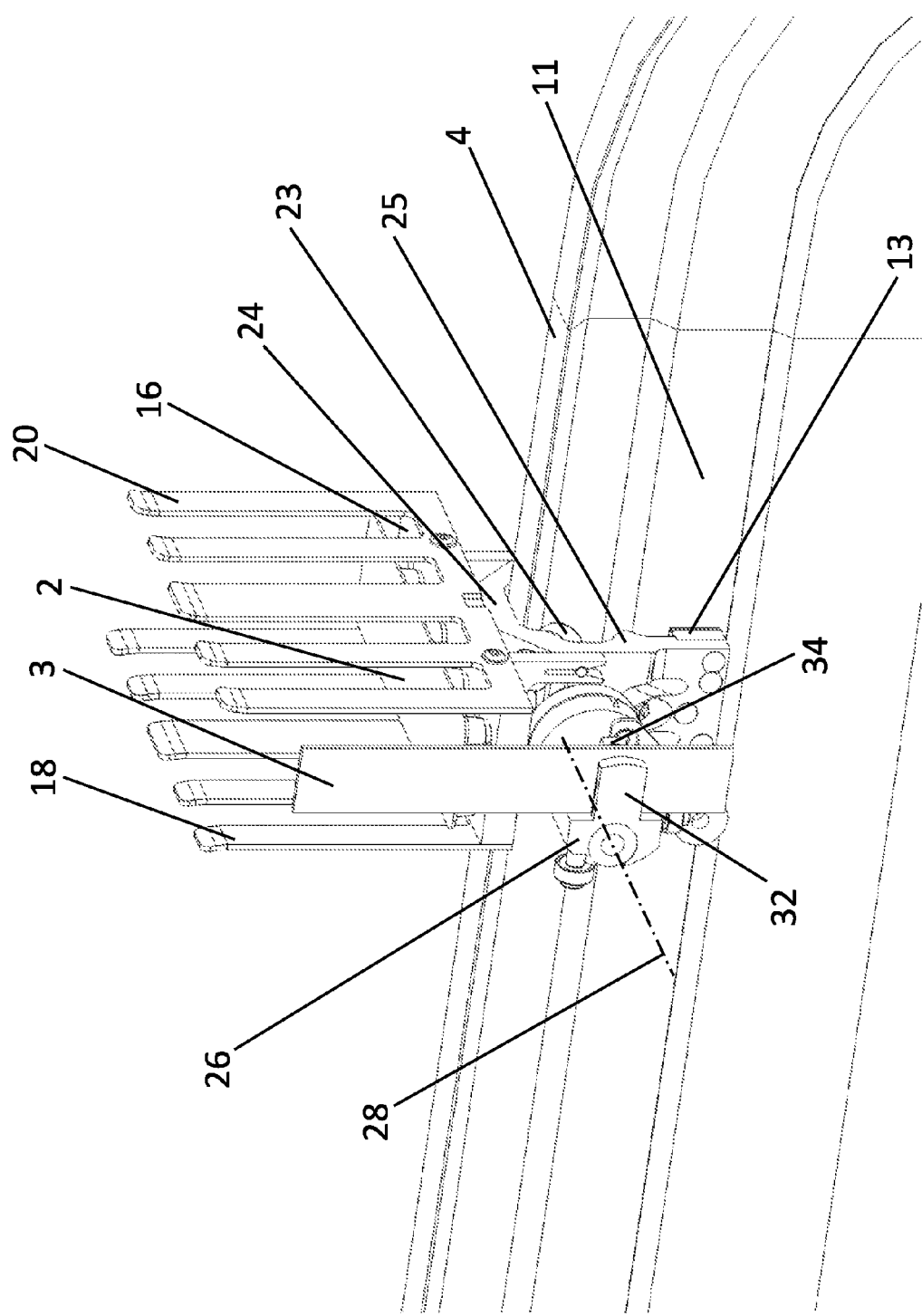
FIG. 2 shows an enlarged view of a section of the transport device of FIG. 1, in which a slide with a gripper is shown on the guide rail.

To drive the slides 6, 8, 10, a linear motor drive device 11 is used. The linear motor drive device 11 is integrated into the guide rail 4 and comprises a plurality of coils, arranged in a row, which can be supplied individually with current. Each of the slides 6, 8, 10 comprises in turn at least one, preferably two permanent magnets 13, which work together with the linear motor drive device 11. The slides 6, 8, 10 are supported and guided along the guide rail 4 by a plurality of guide rollers 23 (FIG. 2). There are many different possibilities for configuring the slides 6, 8, 10 and their support on the guide rail 4.

The guide rail 4 is an endless rail, and the slides 6, 8, 10 move once around the entire guide rail 4 until they reach their starting position again. As FIG. 1 shows, one slide 6 is arranged on the upper run of the endless guide rail 4, whereas the other two slides 8, 10 are arranged on the lower run of the endless guide rail 4.

As is clear from FIG. 1, the linear motor drive device 11 in the example shown here lies inside the oval form defined by the guide rail 4 and for its own part also comprises an oval form. Each slide 6, 8, 10 will, accordingly, travel along a straight line at certain times and around a curve at other times. Through a combination of straight lines and curves, it is possible to realize travel paths of the products of any desired shape in addition to the oval path shown in FIG. 1. Many other configurations are therefore possible.

Figure 5:
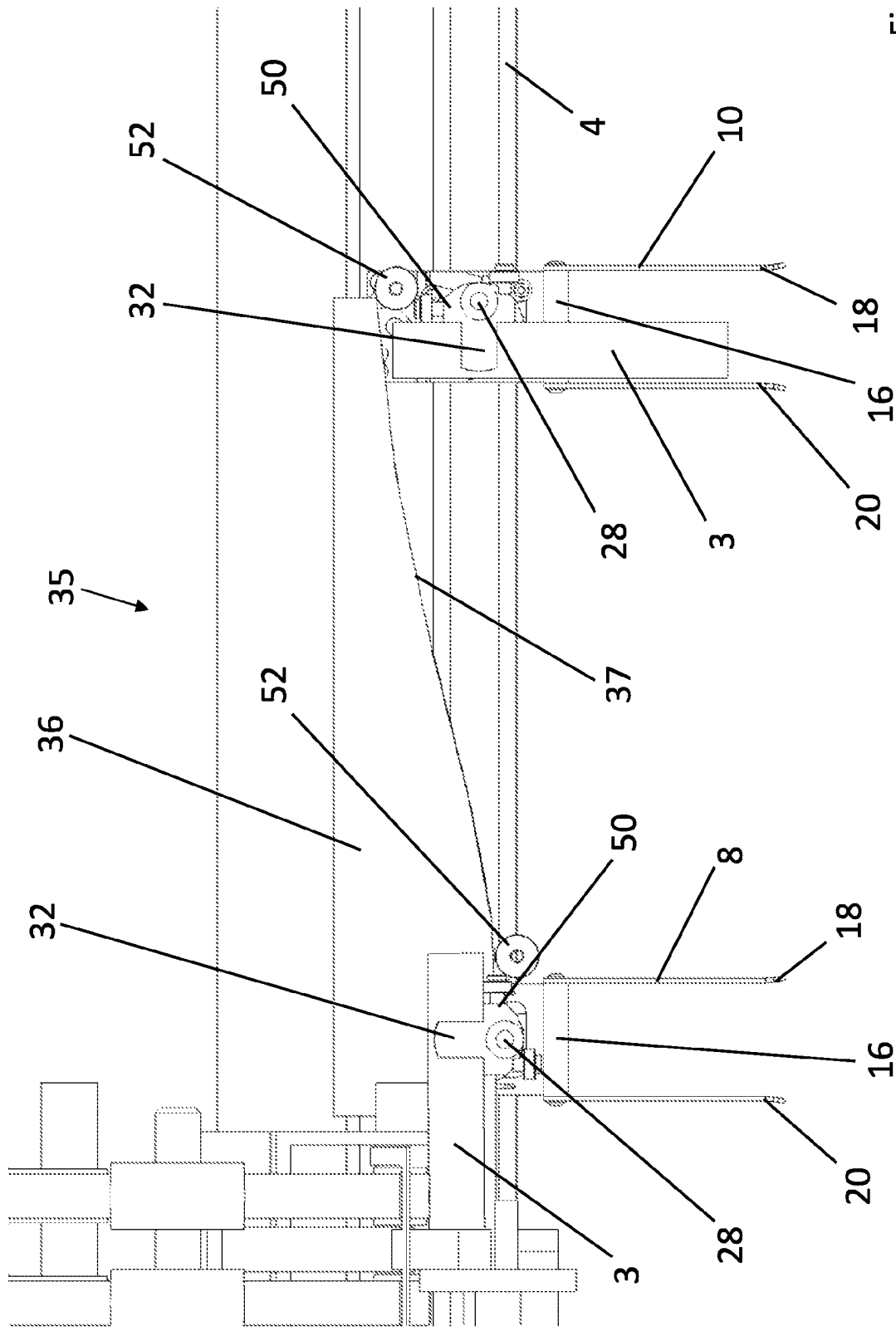
FIG. 5 shows an enlarged front view of a section of the transport device of FIG. 1, in which parts of the transport device and of the cam plate mechanism of the slide are shown.

Also shown in FIG. 1 is a folding station 12 for folding flat product insert sheets. The folding station 12 comprises appropriate mechanical devices and tools for producing the desired creases. The folding station 12 is in turn followed by a product insert feed station 14, which comprises several belts 15, which pass around pulleys. The belts 15 take the folded product inserts 3 from the folding station 12 and feed them to the transport device 1, as will be described in greater detail below. As shown in FIG. 5, the transport device 1 also has a cam plate mechanism 35 in the area of the product insert feed station 14. This mechanism will also be described more fully below.

FIG. 2 shows an enlarged view of the slide 6 located on the guide rail 4 at the top right in FIG. 1. Each slide 6, 8, 10 comprises a bottom element 16 and two side boundary elements 18, 20 projecting vertically upward from the bottom and extending transversely to the travel path of the products. These boundary elements 18, 20 define the receptacle for the blister packs 2. In addition, the sides of the slides 6, 8, 10 are open between the two side boundary elements 18, 20. The slides 6, 8, 10 also comprise a substantially horseshoe-shaped or inverted U-shaped base body 24, from the inner arms of which guide rollers 23 (only one of which is shown in FIG. 2) project inwardly. The bottom element 16 is in turn arranged on the top of the base body 24.

FIG. 2 also shows in particular a retaining element 26 for holding a folded product insert 3. The retaining element 26 is attached laterally to one arm 25 of the base body 24 and is supported there pivotably around a rotational axis 28, which is perpendicular to the travel path of the products and the path of the guide rail, respectively. To hold the folded product insert 3, the retaining element 26 is formed as a gripper with several, in the present case two, gripping arms 32, 34. Only the gripping arm 32 is shown in its entirety in FIG. 2.

As can also be derived from FIG. 2, the retaining element 26 extends from the arm 25 perpendicularly to the travel path of the products, i.e., in the same direction as that in which the long side of the bottom element 16 extends, and projects so far beyond the bottom element 16 in a direction leading out from the plane of the drawing that the product insert 3 is held, laterally adjacent, to one side of the slide 6. The gripping arms 32, 34 of the retaining element 26 are parallel to the travel path.

Figure 3:
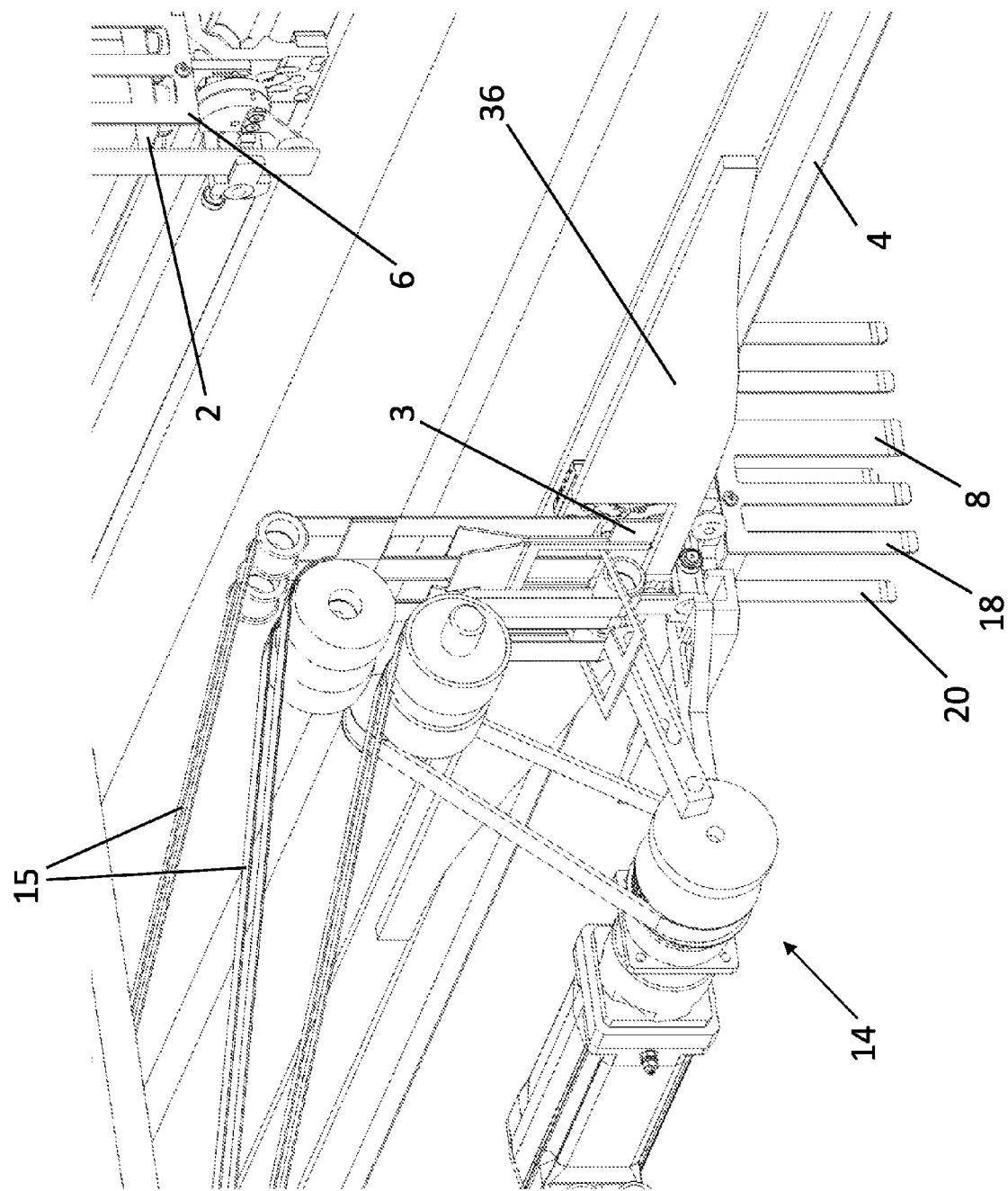
FIG. 3 shows an enlarged view of an additional section of the transport device of FIG. 1, in which the product insert feed station and a slide with its associated cam plate mechanism are shown.

FIG. 3 shows an enlarged view of a section of the transport device 1 illustrated in FIG. 1. This diagram shows the slide 6, previously described on the basis of FIG. 2, and an additional slide 8, constructed in the same way, which is located in the area of the product insert feed station 14. The outer ends of the side boundary elements 18, 20 of the lower slide 8 point downward. The lower slide 8 has been moved into a position next to the product insert feed station 14 so that it can receive a folded product insert 3. On one side of the guide rail 4, in the area of the product insert feed station 14, i.e., between the guide rail 4 and the product insert feed station 14, a cam plate 36 is arranged, which is described in greater detail below.

Figure 4:
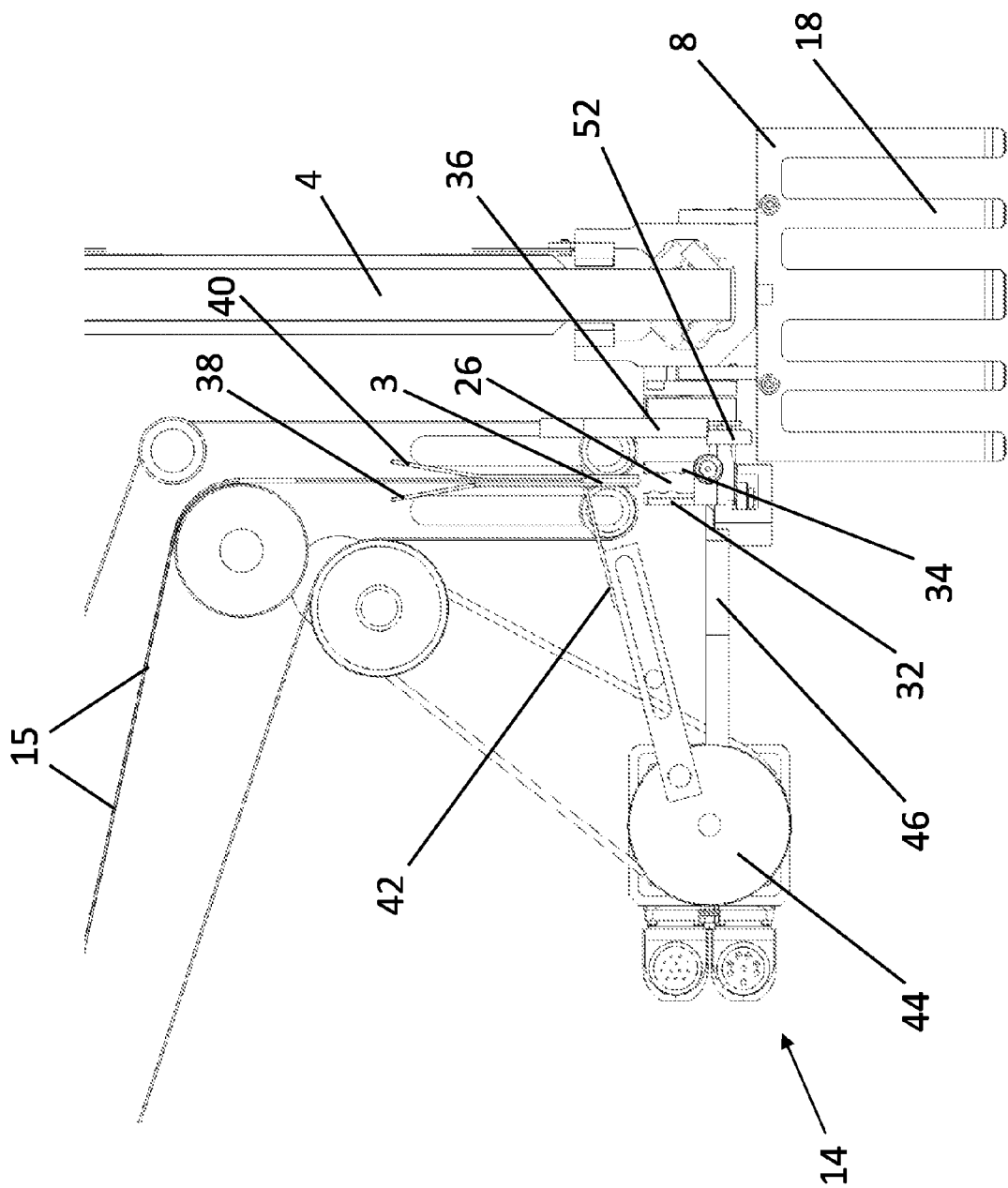
FIG. 4 shows an enlarged side view of a section of the transport device and of the product insert feed station of FIG. 3.

FIG. 4 shows a side view of the arrangement illustrated in perspective in FIG. 3. The product insert feed station 14 comprises two guide plates 38, 40, through which a folded product insert 3 is guide downward by means of the belts 15, which are arranged close together. The product insert 3 is thus brought down to the open retaining element 26. So that the product insert 3 can be conveyed reliably downward out of the lower area of the guide plates 38, 40, a rake 42 is provided, which executes pushing movements from top to bottom at regular intervals by means of a cam drive 44.

A pusher element 46 in the form of a pushrod is also attached to the cam drive 44. The pusher element 46 serves to move the gripping arm 34 (i.e., the arm which faces the slide 8 and which is pretensioned by a spring (not shown) toward the gripping arm 32 facing away from the slide 8) away from the other gripping arm 32 against the force of the spring in order to open the retaining element 26 so that it can receive the product insert 3 (in the opened or deactivated state). To close the retaining element 26, the pusher element 46 is moved back, that is, toward the left in FIG. 4, so that the gripping arm 34 is pushed by the force of the spring against the second gripping arm 32 (to the closed or activated state).

FIG. 5 shows an enlarged front view of a section of the lower run of the transport device 1 and of the cam plate mechanism 35. Two slides 8, 10 are shown in all. With respect to their rotational position, the gripping arms 32, 34 of the retaining element 26 of the left slide 8 are in the product insert receiving position; that is, the gripping arms 32, 34 are extending substantially transversely to the travel path of the products and thus away from the bottom element 16 of the slide 8. With respect to their rotational position, the gripping arms 32, 34 of the retaining element 26 of the right slide 10, however, are already in the product insert transfer position (as shown in, for example, FIG. 2). In the product insert transfer position, the gripping arms 32, 34 of the retaining element 26 are 18, 20 parallel to the travel path of the products.

The retaining element 26 is pretensioned in the counterclockwise direction around the rotational axis 28 by the force of a spring and is connected to a cam roller 52 by way of a connecting element 50, which functions as a lever. The cam roller 52 is also pressed by the force of a spring against the cam plate 36 and is thus able to roll along the bottom edge 37 of the cam plate 36. When the left slide 8 is now moved toward the right by the linear motor drive device 11, the cam roller 52 rolls along the rising bottom edge 37 of the cam plate 36. This is accompanied by a pivoting movement of the connecting element 50 in the counterclockwise direction by about 90° in the direction in which the spring force is acting. As a result, the retaining element 26 is also pivoted by about 90° in the counterclockwise direction in the direction of the spring force. When the cam roller 52 rolls down the descending edge of the cam plate 36 (see FIG. 1), the retaining element 26 moves back into the starting position again against the force of the spring. Whereas the product insert 3 is being held in a horizontal position on the left slide 8 (product insert receiving position), the product insert 3 is being held in a vertical position on the right slide 10 (product insert transfer position).

A receiving/transfer cycle of a product insert 3 can be described as follows on the basis of the figures. A slide, such as the slide 8 in FIG. 1, is moved toward the product insert feed station 14 but has not yet reached the cam plate 36. As soon as the slide reaches the cam plate 36, the cam roller 52 rolls along the ascending edge of the cam plate 36 and causes the retaining element 26 to pivot, so that the retaining element 26, with respect to its rotational position, pivots from the product insert transfer position into the product insert receiving position shown in FIGS. 3 and 4. In this product insert receiving position, the gripping arms 32, 34 of the retaining element 26 are pointing upward. After the retaining element 26 has been opened by the pusher element 46, in other words, while the retaining element 26 is in the deactivated state, a product insert 3 is introduced between the gripping arms 32, 34 of the retaining element 26. The pusher element 46 is pulled back, and thus the gripping arms 32, 34 close and tightly clamp the product insert 3 (activated state of the retaining element 26). Then the slide is moved further along the guide rail 4 in the counterclockwise direction out of the position occupied by the slide 8 in FIG. 3, while the cam roller 52 rolls down the descending edge of the cam plate 36, the retaining element 26 thus being pivoted back into its product insert transfer position by the force of the spring (i.e., the position occupied by the right slide 10 in FIGS. 1 and 5). Then the slide is moved further along in the counterclockwise direction until it reaches the upper run of the endless guide rail 4, as shown in FIG. 2.

Like the slide 6 shown in FIGS. 2 and 1, the slide can now travel along the upper run of the guide rail 4 and pick up the product 2 or the products 2, preferably stacks of blister packs, at the appropriate point. In FIGS. 1 and 2, a product 2 has already been placed in the receptacle of the slide 6. Then the slide, holding the at least one product 2 and the associated product insert 3, are moved to a transfer position, in which the product insert 3 is released and pushed together with the at least one product 2 into a package, preferably a folding box. With respect to its rotational position here, the retaining element 26 remains in the product insert transfer position, although at the time of the transfer it must be switched over to the deactivated state (opened position).

Although it has been assumed here that the slides 6, 8, 10 move along the guide rail 4 in the counterclockwise direction, it is obviously also possible for the slides 6, 8, 10 to move around the guide rail 4 in the clockwise direction in the device shown here. That is, the transport device can be operated bidirectionally.

In the example described here, the retaining element 26 has been described as a pair of gripping arms, the activated state of which is the closed position of the gripping arms 32, 34, i.e., the state in which the product insert 3 is being held, whereas the deactivated state is the opened position of the gripping arms 32, 34, i.e. the state in which the product insert 3 is released or received. Other types of retaining elements 26 are also possible, however, such as suction elements or the like.

The invention claimed is:

1. A method for conveying products comprising the steps of:
   providing a transport device comprising at least one movable slide for conveying at least one product, a receptacle for receiving the at least one product, a retaining element for holding a product insert, a guide rail for guiding the at least one slide, and a linear motor drive device for driving the at least one slide, wherein the receptacle and the retaining element are arranged on the at least one slide;
   introducing the product insert in the retaining element in a product insert feed station;
   placing the at least one product in the receptacle;
   simultaneously moving the at least one product and the product insert along the guide rail into a transfer position, wherein the product insert is located laterally adjacent to the at least one product during the step of moving; and
   transferring the at least one product together with the product insert into a package.

2. The method for conveying products according to claim 1, further comprising the step of operating the retaining element from an activated state to a deactivated state before the step of introducing the product insert in the retaining element, and further comprising the step of operating the retaining element from the deactivated state to the activated state after the step of introducing the product insert in the retaining element.

3. The method for conveying products according to claim 2, further comprising the step of holding the product insert with the retaining element in the activated state after operating the retaining element from the deactivated state to the activated state.

4. The method for conveying products according to claim 2, wherein the steps of operating the retaining element between the deactivated state and the activated state comprise the step of pivoting the retaining element around a rotational axis of the retaining element.

5. The method for conveying products according to claim 1, wherein the step of transferring the at least one product together with the product insert into a package comprises the steps of releasing the product insert and of pushing the at least one product together with the product insert into the package.

6. The method for conveying products according to claim 1, wherein the step of moving the at least one product and the product insert comprises the step of driving the at least one movable slide along the guide rail.

7. The method for conveying products according to claim 6, wherein the linear motor drive device operatively interacts with the at least one moveable slide to drive the at least one movable slide along the guide rail.

* * * * *